United States Patent [19]
Uhrner et al.

[11] Patent Number: 5,538,259
[45] Date of Patent: Jul. 23, 1996

[54] SEALING DEVICE WITH CENTERING RING FOR A WATER PUMP

[75] Inventors: Klaus-Jürgen Uhrner, Leingarten; Dietmar Ullrich, Untergruppenbach, both of Germany

[73] Assignee: KACO GmbH & Co., Heilbronn, Germany

[21] Appl. No.: 405,907

[22] Filed: Mar. 17, 1995

[30] Foreign Application Priority Data

Mar. 19, 1994 [DE] Germany ............................ 44 09 537.6
Oct. 15, 1994 [DE] Germany ............................ 44 36 879.8

[51] Int. Cl.⁶ ........................................................ F16J 15/36
[52] U.S. Cl. .............................. 277/41; 277/42; 277/89; 277/93 R; 384/481
[58] Field of Search ................................ 277/38, 39, 40, 277/41, 42, 43, 9, 11, 81 R, 88, 89, 90, 92, 93 R, 93 SD, 91, 84; 384/142, 481

[56] References Cited

U.S. PATENT DOCUMENTS

| 2,316,059 | 4/1943 | Fretter | 277/42 |
|---|---|---|---|
| 3,020,052 | 2/1962 | Gits | 277/89 |
| 3,338,584 | 8/1967 | Nakanishi et al. | 277/9 |
| 3,658,395 | 4/1972 | Hallerback | 277/183 |
| 3,895,811 | 7/1975 | Richard et al. | 277/42 |
| 4,136,885 | 1/1979 | Uhrner | 277/42 |
| 4,502,694 | 3/1985 | Uhmer | 277/9 |
| 4,768,923 | 9/1988 | Baker | 277/93 SD |
| 4,917,389 | 4/1990 | Baker et al. | 277/42 |
| 5,199,719 | 4/1993 | Heinrich et al. | 277/92 |
| 5,375,852 | 12/1994 | Charhut | 277/42 |

FOREIGN PATENT DOCUMENTS

403041265 2/1991 Japan ........................ 277/9

*Primary Examiner*—Scott W. Cummings
*Attorney, Agent, or Firm*—Robert W. Becker & Associates

[57] ABSTRACT

The sealing device has a casing and a shaft extending through the casing. A bearing housing with an outer ring bearing is received in the casing. The shaft is rotatably supported in the bearing housing. A slide ring sealing unit including a slide ring, a counterring, and at least one compression spring is provided. The slide ring is forced by the compression spring against the counterring. A centering ring with centering elements is provided. The slide ring sealing unit is connected with the centering ring to the bearing housing, and the slide ring sealing unit is centered at the bearing housing with the centering elements.

21 Claims, 2 Drawing Sheets

5,538,259

SEALING DEVICE WITH CENTERING RING FOR A WATER PUMP

BACKGROUND OF THE INVENTION

The present invention relates to a sealing device, particularly for a water pump, with a slide ring sealing unit that is provided with a slide ring that abuts a counterring under the force of at least one compression spring; the counterring is connected to a bearing housing that is provided with an outer ring bearing; the bearing housing is inserted into a casing portion; the bearing bodies of the bearing housing rotatably support a shaft.

It is known to mount such sealing units within water pumps for motor vehicles. The pump shaft is supported rotatably by bearings, the casings of which are inserted into a receiving portion of the pump casing. For mounting the slide ring sealing unit the bearing housing is correspondingly elongated. This, however, causes an increase in price of the bearing housing and thus of the entire sealing device. Moreover, problems occur in respect to the sealing action. In particular, between the pump casing and the elongated bearing housing, the pumped medium can leak toward the outside.

It is therefore an object of the present invention to improve the aforementioned sealing device such that it can be mounted easily and be manufactured cost-efficiently.

SUMMARY OF THE INVENTION

The sealing device according to the present invention is primarily characterized by:

a casing;

a shaft extending through the casing;

a bearing housing comprising an outer ring bearing, the bearing housing received in the casing, wherein the shaft is rotatably supported in the bearing housing;

a slide ring sealing unit comprising a slide ring, a counterring, and at least one compression spring;

the slide ring is forced by the at least one compression spring against the counterring;

a centering ring comprising centering elements, wherein the slide ring sealing unit is connected with the centering ring to the bearing housing and wherein the slide ring sealing unit is centered at the bearing housing with the centering elements.

The centering elements are preferably tongues projecting in the axial direction of the centering ring, wherein the outer ring bearing has at least one recess for engaging the tongues.

The outer ring bearing advantageously has an outer mantle surface and the at least one recess is provided at the outer mantle surface.

Expediently, the at least one recess has a radially extending bottom and the centering elements abut the bottom.

Preferably, the centering ring is placed onto the ring bearing and is secured thereat by the compression spring.

In a preferred embodiment of the present invention, the centering ring comprises a cylindrical neck and the counterring has a radially inner surface resting on the cylindrical neck.

The sealing device preferably further comprises a gasket supported on the centering ring. The counterring is received in the gasket. The gasket is forced axially against the centering ring by the compressing spring.

Advantageously, the slide ring sealing unit further comprises a secondary sealing member and a spring plate for axially supporting the compression spring. The secondary sealing member is positioned between the slide ring and the spring plate, and the slide ring is fixedly connected to the shaft with the secondary sealing member and the spring plate.

The sealing device according to a further embodiment of the present invention comprises:

a casing;

a shaft extending through the casing;

a bearing housing comprising an outer ring bearing, the bearing housing received in the casing, wherein the shaft is rotatably supported in the bearing housing;

a slide ring sealing unit comprising a slide ring, a counterring, and at least one compression spring;

the slide ring forced by the at least one compression spring against the counterring;

the slide ring having a radially inner wall;

a centering ring comprising centering elements, wherein the slide ring sealing unit is connected with the centering ring to the bearing housing and wherein the slide ring sealing unit is centered at the bearing housing with the centering elements;

the slide ring sealing unit further comprising a bellows-shaped secondary sealing member connected to the slide ring; and the secondary sealing member comprising at least one dampening member supported on the shaft and on the radially inner wall of the slide ring by being elastically deformed.

The dampening member preferably has a funnel-shaped end resting on the radially inner wall by being elastically deformed. The funnel-shaped end has a transition into a cylindrical portion, and at the transition a radially inwardly projecting rib is provided that rests on the shaft. The radially inwardly projecting rib extends circularly over the inner periphery of the dampening member. Preferably, the inner diameter of the projecting rib, before mounting on the shaft, is smaller than a diameter of the shaft.

The centering ring comprises at least one gasket element for inserting the centering ring sealingly into the casing and into the ring bearing.

The centering elements are preferably in the form of axially spaced ring members, wherein a first one of the ring members is inserted into the ring bearing and a second one of the ring members is inserted into the casing.

Advantageously, the centering ring comprises a cylindrical wall for connecting the ring members, wherein the cylindrical wall comprises at least one window. The casing has at least one leak hole and wherein the at least one window communicates with the at least one leak hole.

The first ring member expediently comprises a sealing ring resting on the shaft. The first ring member preferably comprises a base body and the gasket element is positioned on the base body on a side thereof facing the bearing housing.

The ring bearing has an inner cylindrical wall with a circular groove and the gasket element has a radial outer rim engaging in the circular groove.

The second ring member comprises one of the at least one gasket elements. This gasket element sealingly rests on a radially outer mantle surface of the counterring.

With the inventive sealing device the slide ring sealing unit is connected in a centering manner to the bearing housing via a centering ring. Thus it is not required to elongate the bearing housing so that conventional bearing housings can be employed which are commercially available at low cost. The centering of the slide ring sealing unit at the bearing housing by means of a centering ring, moreover, provides for an easy and thus also cost-efficient mounting of the inventive sealing device.

The inventive sealing device with a transition of the funnel-shaped widened end into a cylindrical part and a radial rib at the transition that rests on the shaft can also be manufactured and mounted very easily and cost-efficiently. The dampening member ensures a complete sealing action for the slide ring sealing unit when the inventive sealing unit is operated. Since the dampening member is being stress deformed in the fitting position and rests at the shaft and the interior wall of the slide ring under the stress deformation, larger manufacturing tolerances, which may occur during the manufacturing process of the slide ring and the dampening member, can be easily compensated. Moreover, an accurate centering of the slide ring relative to the shaft is ensured with the inventive design of the dampening member.

With the inventive sealing unit having a centering ring with at least one gasket, the centering ring is inserted with its gasket into the housing member and into the outer ring bearing of the roller bearing. Therefore, it is not required for the ring bearing to be provided at its exterior surface with an indentation for receiving portions of the centering member. Thus a machining of the ring bearing is not required. The centering member (centering ring) of the inventive sealing unit includes the gasket with which the bearing is sealed off. Therefore, it is not required to mount such a gasket separately since it is already mounted after mounting the centering ring.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
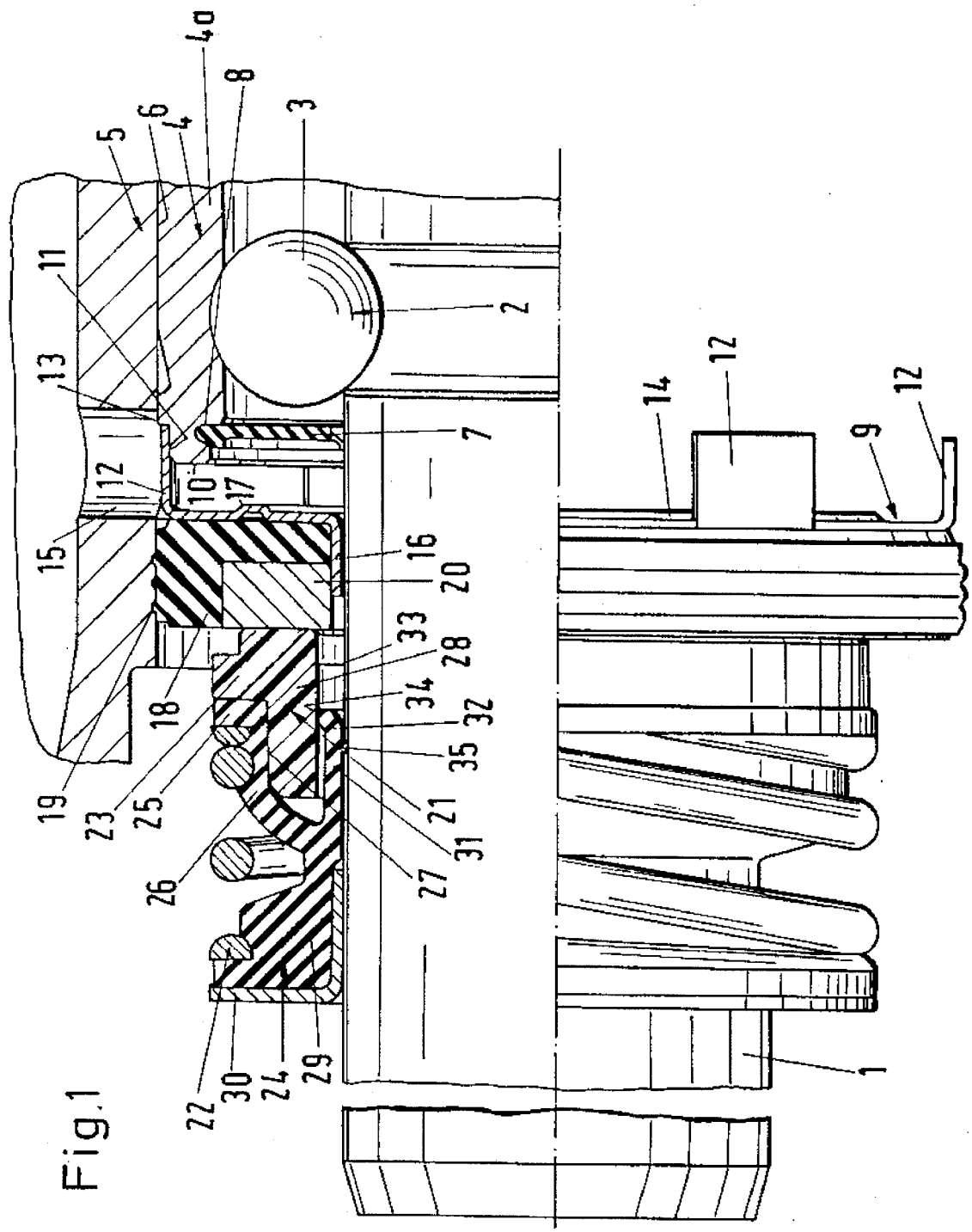
FIG. 1.

The sealing unit illustrated in FIG. 1 is an axial slide ring sealing unit that is a part of a water pump. It provides a shaft 1 that in the exemplified embodiment is rotatably supported by roller bearings. In FIG. 1 only one of the bearings is illustrated. The bearing 2 comprises roll bodies 3, in the exemplified embodiment balls, which are arranged in a bearing housing 4. The bearing 2 is installed in a pump casing 5 that has a respective receiving portion 6 for the bearing housing 4. The bearing housing 4 with the roll bodies 3 is designed in a manner known per se, and is therefore not described in detail.

Into the bearing housing 4 a cover plate 7 is inserted that engages with its rim a ring groove 8 within the interior wall of an outer ring bearing 4a of the bearing housing 4.

For achieving a sealing action the axial slide ring sealing unit is provided which is centered by a centering ring 9 relative to the pump casing 5, respectively, to the bearing housing 4. The centering ring 9 is loosely set onto the ring bearing 4a that has a recess in the form of a circular step 11 at its outer periphery which has a transition into the end face 10 of the ring bearing 4a. The centering ring 9 is provided with axially projecting centering elements (tongues) 12 that are spaced around its periphery and rest on the ring bearing 4a. The centering tongues 12 have an axial length that is larger than the depth of the step 11. Thus the centering ring 9 can be slipped axially onto the ring bearing 4a very easily to the extent that the centering tongues 12 rest against the bottom 13 of the step 11. In the area of the step 11 the centering tongues 12 also rest on the outer mantle surface of the ring bearing 4a. As the centering tongues 12 are designed with a space between one another in the peripheral direction, passages 14 are created between neighboring centering tongues 12 through which vapor can escape that forms during the operation of the axial slide ring sealing unit. The pump casing 5 is provided with respective leak holes 15.

For centering the centering ring 9 a low number of centering tongues 12 is sufficient which are therefore arranged at a large distance spaced from one another. In that way the passages 14 provide sufficiently large cross-sectional areas for the escape of vapor. By way of this a correlation between an outlet in the area of a bearing housing and a respective leak hole within the pump casing is not required, as is the case with the known embodiments, so that the assembly is substantially facilitated.

The centering ring 9 has a cylindrical neck 16 that is arranged in the opposite direction of the centering tongues 12 and which surrounds the shaft 1 at a small distance. In the area between the centering tongues 12 and the neck 16 the centering ring 9 is provided with a circular stiffening corrugation 17 which reinforces the disc-shaped radial centering ring 9.

At the centering ring 9 a gasket 18 is supported which rests sealingly with its cylindrical exterior mantle surface 19 at the interior wall of the receiving portion 6 of the pump casing 5. By this means the pump casing 5 is completely sealed off. The exterior mantle surface 19 is shaped advantageously so as to have a profile such as, for example, a resepctive wave-shaped profile as shown in the exemplified embodiment. On mounting the gasket 18 into the receiving portion 6, the profiled exterior mantle surface 19 is stress-deformed such that a complete sealing action is achieved. The gasket 18 extends to the neck 16 of the centering ring 9. Into the gasket 18 a counterring 20 is inserted on which a slide ring 21 rests axially in a manner known per se under the force of a compression spring 22. The end faces of the gasket 18 and of the counterring 20 are arranged advantageously in a common radial plane. The counterring 20 has a radially inner surface with which it rests on the neck 16 of the centering ring 9. The internal diameter of the slide ring 21 is larger than the external diameter of the shaft 1.

At a collar 23, positioned radially outwardly, of the slide ring 21 a bellows-shaped secondary sealing member 24 abuts a radially outwardly ring flange 25. One end of the compression spring abuts this ring flange 25.

The secondary sealing member 24 is provided with a bellows portion 26 which has a transition into the ring flange 25 and which rests on a cylindrical projection 28 of the slide ring 21. The bellows portion tapers conically in the area before the projection 28 of the slide ring 21 and has a transition into a widened end portion 29 that is secured by a spring plate 30. The spring plate 30 is fixedly connected to the shaft 1 and supports the compression spring 22 by the end portion 29.

The slide ring 21 is pushed firmly against the counterring 20 by the compression spring 22, and thus the required sealing action is achieved. The centering ring 9 is as well pushed firmly onto the bearing housing 4 by the force of the compression spring 22. Thus it is not required to mount the centering ring 9 separately on the bearing housing 4. The centering ring 9 is simply set loosely onto the bearing housing 4 and is held in the mounted position by the compression spring 22. Thus a very simple installation of the slide ring sealing units is ensured. It is attached to the bearing housing 4 in the described way and therefore the bearing housing 4 can be designed conventionally, in particular, it does not have to be elongated axially past the roll body 3. Since conventional, short bearing housings 4 can be employed, an extremely cost-efficient manufacturing results from the application of the slide ring sealing unit and its attachment via a centering ring 9.

By means of the cylindrical neck 16 of the centering ring 9 the counterring 20 and the slide ring 21 can be centered accurately during mounting such that, during mounting, these delicate sealing members are not being damaged. Via the spring plate 30 and the secondary sealing member 24 the slide ring 21 is rotationally fixedly connected to the shaft 1 whereas the counterring 20 is positioned stationary. This results in an especially short axial length of the slide ring gasket. As the receiving portion 6 of the pump casing 5 is sealed toward the outside by the gasket 18, a complete sealing action of the bearing 2 is secured.

The slide ring 21 is arranged on the shaft 1 elastically dampened and centered relative to the latter. An axial tubular projection 31 of the secondary sealing member 24 acts as a dampening member which not only acts material-elastically but, moreover, has such a shape that it also acts form-elastically. The free end 32 of the projection 31 widens in a funnel-shaped manner and rests against the cylindrical inner wall of the slide ring 21. The end face 34 of the funnel-shaped end 32 is rounded in an arc-shaped manner such that damages to the interior wall 33 of the slide ring 21 are prevented. The projection 31 of the secondary sealing member 24 has a radial distance to the interior wall 33 of the slide ring 21 and rests linearly on the interior wall 33 only with its funnel-shaped end 32. In the transition area from the cylindrical axial portion of the projection 31 to the funnel-shaped enlarged portion 32 the projection 31 is provided at its inner side with a circular projecting rib 35 the internal diameter of which, when it is not mounted, is smaller than the diameter of the shaft 1. Therefore, the projection 31 is enlarged in a stress-deforming manner in the area of the rib 35 to the shaft diameter when the slide ring sealing unit is mounted. Simultaneously, also the funnel-shaped end 32 of the projection 31 is being stress deformed since it rests with its end face 34 on the interior wall 33 of the slide ring 21. Thus, by stress-deforming, a bracing of the funnel-shaped end 32 is achieved that causes the radial centering as well as the axially acting dampening of the slide ring 21. The projection 31 as well as the bellows portion 26 have a transition into the thickened end portion 29 of the secondary sealing member 24 at the same level.

The projection 31 of the secondary sealing member 24 is advantageously composed of rubber, like the entire secondary sealing member 24 but can also be composed of any other form-elastic material, for example, thermoplastics.

As the projection 31 which acts as a dampening and centering member is designed in one piece with the secondary sealing member 24, the result of this is a particularly simple design of the slide ring sealing unit. The shaft 1 does not have to be machined, in particular, it does not have to provide a circular groove for receiving a dampening ring.

With the known dampening measures the shaft has to be provided with a circular groove which receives a dampening ring on which the slide ring rests. The manufacturing of the circular groove is very costly. With these known slide ring gaskets the groove diameter, the cross-section of the dampening ring, as well as the internal diameter of the slide ring have to be manufactured with very small tolerances in order to achieve the required centered position, respectively, in order to prevent a jamming of these members. With the described inventive embodiment a circular groove for axially securing the damping member 31 is not required. As a result of the described stress deformation no small manufacturing tolerances have to be observed during the manufacturing of the slide ring 21 and of the projection 31. Thus the described slide ring sealing unit can be manufactured very cost-efficiently. However, an accurate centering of the slide ring 21 is ensured.

The described dampening and centering by means of a projection 35 can be applied in connection with any kind of slide ring sealing unit and is not limited to the described exemplified embodiment.

Figure 2:
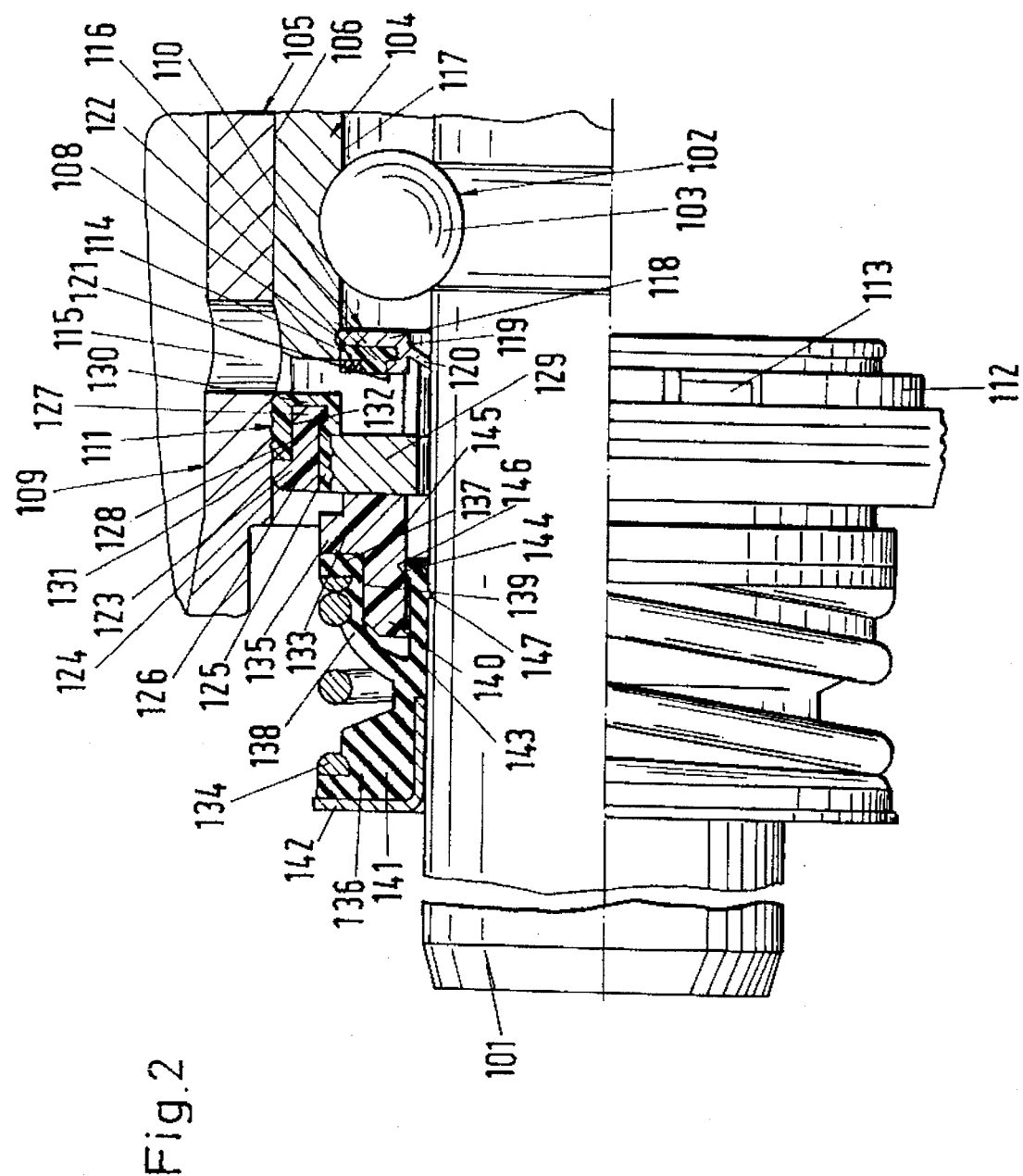
FIG. 2 are a side view and an axial section, respectively, of an inventive slide ring sealing.

The gasket illustrated in FIG. 2 is also an axial slide ring sealing unit that is a part of a water pump. It has a shaft 101 which is rotatably supported by bearings 102, in the exemplified embodiment by roller bearings 103 of which only one is illustrated in FIG. 2. It is provided with roll bodies 103, in the exemplified embodiment with balls which are arranged in a ring bearing 104. It is mounted in a pump casing 105 that has a respective receiving portion 106 for the ring bearing 104. The ring bearing 104 with the roll bodies 103 is designed in a way known per se and is therefore not described in detail.

For achieving a sealing action the axial slide ring sealing unit is provided which is centered by a centering ring 109 relative to the pump casing 105, respectively, to the ring bearing 104. It is advantageously composed of synthetic, like a thermoplastic or a thermosetting plastic. The centering ring 109 has a ring member 110 that is designed at the end, as well as an axially spaced ring member 111 at its opposite end. The two ring members 110, 111 are connected by a cylindrical wall 112 within which windows 113 are provided, spaced from one another, for allowing the passage of vapor. The windows 113 are rectangular in cross-section and are advantageously spaced evenly around the periphery of the wall 112. The two ring members 110, 111 and the wall 112 are advantageously designed as one piece. The pump casing 105 is provided with leak holes 115 through which the vapor that forms when the axial slide ring sealing unit is operated can escape. The windows 113 which are provided for allowing the passage of vapor have sufficiently large cross-sections such that no correlation is required between the windows 113 and the respective leak holes 115. Thus the mounting of the axial slide ring sealing unit is significantly facilitated.

The ring member 110, positioned proximal to the bearing, has a ring-shaped base body 114 the axis of which coincides with the axis of the shaft 101. The bottom surface facing the bearing 102 of the base body 114 is covered by a gasket element 116 that engages with its radially outer circular rim a circular groove 108 within the cylindrical interior wall 117 of the ring bearing 104. The gasket element 116 has a transition into a cylindrical mantle 118 that covers the cylindrical interior mantle 119 of the base body 114. The cylindrical mantle 118 surrounds the shaft 101 at a radial distance. From the mantle 118 a conically tapered sealing ring 120 extends toward the shaft 101 and rests on the shaft 101. It is slightly angled toward the slide ring sealing unit. This ring 120 has a small thickness and thus is embodied elastically such that the mounting of the centering ring 109 on the shaft 101 can be carried out easily.

The base body 114 of the ring member 110 is, at the surface that is facing the ring member 111, also covered with a gasket element 121 that is advantageously formed as one piece together with the cylindrical gasket mantle 118. Like the gasket element 116, also the conical ring 120 is advantageously formed as one piece together with the mantle 118.

A ring 122, the end face of which is positioned flush with the end face of the gasket element 121, is positioned at the end face of the base body 114 which is facing the ring member 111. The base body 114 rests with its exterior mantle surface on the interior wall 117 of the ring bearing 104.

The ring member 111, which is positioned at an axial distance opposite the ring member 110, is provided with a larger radial interior and exterior diameter than the ring member 110. The ring member 111 also has a base body 123 made of synthetic that can be a thermo- or thermosetting plastic. The axis of the base body 123 and thus of the ring member 111 coincides with the axis of the shaft 101. The radially inner cylindrical mantle surface 124 of the base body 123 is covered by a gasket element 125 that extends from the planar end face 126, facing away from the ring member 110 of the base body 123, to its opposite end face 127. The mantle surface 124 of the base body 123 is provided with a projection 128 that acts as an axial stop for a counterring 129 of the axial slide ring sealing unit.

The gasket element 125 has a transition into a gasket element 130 that covers the end face 127 of the base body 123 and which itself has a transition into a radially outer, cylindrical gasket element 131. This gasket element 131 is thicker than the gasket elements 125 and 130. As FIG. 2 illustrates, the radially outer gasket element 131 does not extend across the entire axial length of the base body 123. The base body 123 is provided at its exterior mantle surface, at a distance from its end face 126, with a circular indentation 132 that extends to the opposite end face 127; in this circular indentation 132 the gasket element 131 is positioned. At its outer surface it is preferably profiled along its axial length and is designed to rest sealingly at the interior wall of the pump casing 105 in the mounted position.

The gasket comprised of elements 125, 130, 131 can be composed of any appropriate sealing material.

The counterring 129 that is shaped rectangularly in its axial section rests with its radially exterior mantle surface on the gasket 125 in a sealing manner. The counterring 129 surrounds the shaft 101 at a radial clearance. At the counterring 129 a slide ring 133 is axially supported under the force of a compression spring 134 in a way that is known per se. The end face 126 of the base body 123 of the ring member 111, the end face of the gasket 125, and the end face of the counterring 129 advantageously are positioned in a common radial plane.

On a radially outwardly extending collar 135 of the slide ring 133 a bellows-shaped secondary sealing member 136 rests with a radially outwardly extending ring flange 137. One end of the compression spring 134 rests on this ring flange 137.

The secondary sealing member 136 is provided with a bellows portion 138 that is attached to the ring flange 137; the bellows portion 138 rests on a cylindrical mantle surface 139 of a cylindrical projection 140 of the slide ring 133. The bellows portion 138 tapers conically in the area before the projection 140 of the slide ring 133 and has a transition into a widened end portion 141 that is held by a casing 142. It is fixedly connected on the shaft 101 and supports the compression spring 134 via the end portion 141.

By the compression spring 134 the slide ring 133 is pushed firmly against the counterring 129, and thus the required sealing action is ensured. The centering ring 109 is provided with the gaskets 116, 118, 120, 121; 125, 130, 131 in the described manner such that a separate mounting of a gasket is not required. The centering ring 109, like the ring bearing 104, is inserted into the receiving portion 106 of the pump casing 105. Since the centering ring 109 and the ring bearing 104 have the same external diameter, the receiving portion 106 of the pump casing 105 can have a uniform diameter. Also, the exterior mantle surface of the ring bearing 104 is formed cylindrically throughout since the centering ring 109 is not to be set onto the bearing housing. Thus, a machining and a shaping of the outer ring bearing 104 is not required. Thus, an extremely cost-efficient and simple mounting of the slide ring sealing unit is ensured. It is attached via the centering ring 109 to the ring bearing 104 in the described manner; the ring bearing 104 can therefore have a conventional shape; particularly, it does not have to be elongated axially past the roll bodies 103. Since conventional, short ring bearings 104 can be employed, an extremely cost-efficient manufacturing results from the application of the slide ring gasket and its attachment via a centering ring 109.

The counterring 129 and the slide ring 133 can be centered accurately by the radially outer gasket portion 131 such that these delicate sealing members are not being damaged when mounted. Via the casing 142, the secondary sealing member 136, and the spring 134 the slide ring 133 is rotationally fixed onto the shaft 101, whereas the counterring 129 is arranged stationary. This results in a particularly short axial length of the slide ring sealing unit. Since the receiving portion 106 of the pump casing 105 is sealed relative to the sealing member 127 and radially relative to the inside by the ring 120 a complete sealing action of the bearing 102 is ensured.

The slide ring 133 is arranged on the shaft 101 elastically dampened and is centered relative to the shaft 101. An axial tubular projection 143 of the secondary sealing member 136 acts as a dampening member that not only acts material-elastically but, moreover, has such a shape that it also acts form-elastically. The free end 144 of the projection 143 is enlarged in a funnel-shaped manner and rests on the cylindrical interior wall 145 of the slide ring 133. The end face 146 of the funnel-shaped end 144 is rounded arc-shaped such that damages to the interior wall 145 of the slide ring 133 are prevented. The projection 143 of the secondary joint 136 has a radial distance to the interior wall 145 of the slide ring 133 and rests linearly on the interior wall 145 only with the funnel-shaped end 144. In the transition area from the axial portion of the projection 143 to the funnel-shaped enlarged portion 144 the projection 143 is provided at its inner surface with a circular projecting rib 147 the internal diameter of which, when it is not mounted, is smaller than the diameter of the shaft. Therefore, the inner diameter of the projection 143 is enlarged in a stress deforming manner in the area of the rib 147 to the shaft diameter when the slide ring sealing unit is mounted. Simultaneously, also the funnel-shaped end 144 of the projection is being stress-deformed since it rests with its end face 146 on the interior wall 145 of the slide ring 133. Thus, by stress-deforming a bracing of the funnel-shaped end 134 is achieved that causes the radial centering as well as the axially acting dampening of the slide ring 133. The projection 143 as well as the bellows portion have a transition into the widened end portion 141 of the secondary joint 136 at the same level.

The projection 143 of the secondary sealing member 136 is advantageously composed of rubber like the entire secondary sealing member but can also be composed of any other form-elastic material, for example, thermoplastics.

The present invention is, of course, in no way restricted to the specific disclosure of the specification, examples, and drawings, but also encompasses any modifications within the scope of the appended claims.

What we claim is:

1. A sealing device for a water pump, said water pump comprising a casing, a shaft extending through said casing, and a bearing having a bearing housing and rolling bodies received in said casing, wherein said shaft is rotatably supported by said bearing, said sealing device comprising:

a slide ring sealing unit comprising a slide ring, a counterring, and at least one compression spring;

a centering ring resting loosely at said bearing housing and comprising centering elements; and said compression spring forcing said slide ring against said counterring and said counterring against said centering ring at said bearing housing so that said slide ring sealing unit is connected with said centering ring to said bearing housing and is centered at said bearing housing by said centering elements.

2. A sealing device according to claim 1, wherein said centering elements are tongues projecting in the axial direction of said centering ring, wherein said bearing housing has at least one recess for engaging said tongues.

3. A sealing device according to claim 2, wherein said bearing housing has an outer mantle surface and wherein said at least one recess is provided in said outer mantle surface.

4. A sealing device according to claim 3, wherein said at least one recess has a radially extending bottom and wherein said centering elements abut said bottom.

5. A sealing device according to claim 1, wherein said centering ring is placed onto said bearing housing and is secured thereat by said compression spring.

6. A sealing device according to claim 1, wherein said centering ring comprises a cylindrical neck and wherein said counterring has a radially inner surface resting on said cylindrical neck.

7. A sealing device according to claim 1, further comprising a gasket supported on said centering ring, wherein said counterring is received in said gasket.

8. A sealing device according to claim 7, wherein said gasket is forced axially against said centering ring by said compression spring.

9. A sealing device according to claim 1, wherein:

said slide ring sealing unit further comprises a secondary sealing member and a spring plate for axially supporting said compression spring;

said secondary sealing member is positioned between said slide ring and said spring plate; and said slide ring is fixedly connected to said shaft with said secondary sealing member and said spring plate.

10. A sealing device for a water pump, said water pump comprising a casing, a shaft extending through said casing, and a bearing having a bearing housing and rolling bodies received in said casing, wherein said shaft is rotatably supported by said bearing, said sealing device comprising:

an outer ring bearing connected to said bearing housing;

a slide ring sealing unit comprising a slide ring, a counterring, and at least one compression spring;

said slide ring having a radially inner wall;

a centering ring resting loosely at said bearing housing and comprising centering elements;

said compression spring forcing said slide ring against said counterring and said counterring against said centering ring at said bearing housing so that said slide ring sealing unit is connected with said centering ring to said bearing housing and is centered at said bearing housing by said centering elements;

said slide ring sealing unit further comprising a bellows-shaped secondary sealing member connected to said slide ring;

said secondary sealing member comprising at least one dampening member supported on said shaft and on said radially inner wall of said slide ring by being elastically deformed; and said dampening member having a funnel-shaped end resting on said radially inner wall by being elastically deformed.

11. A sealing device according to claim 10, wherein said funnel-shaped end has a transition into a cylindrical portion and wherein at said transition a radially inwardly projecting rib is provided that rests on said shaft.

12. A sealing device according to claim 11, wherein said radially inwardly projecting rib extends circularly over the inner periphery of said dampening member.

13. A sealing device according to claim 11, wherein an inner diameter of said projecting rib before mounting on said shaft is smaller than a diameter of said shaft.

14. A sealing device according to claim 1, wherein said centering ring comprises at least one gasket element for inserting said centering ring sealingly into said casing and into said bearing housing.

15. A sealing device for a water pump, said water pump comprising a casing, a shaft extending through said casing, and a bearing having a bearing housing and rolling elements received in said casing, wherein said shaft is rotatably supported by said bearing, said sealing device comprising:

a slide ring sealing unit comprising a slide ring, a counterring, and at least one compression spring;

said slide ring having a radially inner wall;

a centering ring resting loosely at said bearing housing and comprising centering elements;

said compression spring forcing said slide ring against said counterring and said counterring against said centering ring at said bearing housing so that said slide ring sealing unit is connected with said centering ring to said bearing housing and is centered at said bearing housing by said centering elements;

said slide ring sealing unit further comprising a bellows-shaped secondary sealing member connected to said slide ring;

said secondary sealing member comprising at least one dampening member supported on said shaft and on said radially inner wall of said slide ring by being elastically deformed; and wherein said centering elements are in the form of axially spaced ring members, wherein a first one of said ring members is inserted into said bearing housing and a second one of said ring members is inserted into said casing.

16. A sealing device according to claim 15, wherein said centering ring comprises a cylindrical wall for connecting said ring members, wherein said cylindrical wall comprises at least one window.

17. A sealing device according to claim 16, wherein said casing has at least one leak hole and wherein said at least one window communicates with said at least one leak hole.

18. A sealing device according to claim 15, wherein said first ring member comprises a sealing ring resting on said shaft.

19. A sealing device according to claim 15, wherein said first ring member comprises a base body and said gasket element is positioned on said base body on a side thereof facing said bearing housing.

20. A sealing device according to claim 19, wherein said ring bearing has an inner cylindrical wall with a circular groove and wherein said gasket element has a radial outer rim engaging in said circular groove.

21. A sealing device according to claim 15, wherein said second ring member comprises one of said at least one gasket elements and wherein said gasket element sealingly rests on a radially outer mantle surface of said counterring.

* * * * *